United States Patent [19]
Colucci

[11] 3,851,433
[45] Dec. 3, 1974

[54] WINDSHIELD AND OR REAR WINDOW POSITIONING MEMBER AND ATTENDANT PERIPHERAL GLASS RIM IN MOTOR CAR BODIES

[75] Inventor: Ivo Colucci, Milan, Italy

[73] Assignee: Alfa Romeo S.p.A., Milan, Italy

[22] Filed: Oct. 23, 1973

[21] Appl. No.: 408,428

Related U.S. Application Data
[63] Continuation of Ser. No. 200,949, Nov. 22, 1971, abandoned.

[30] Foreign Application Priority Data
Nov. 24, 1970 Italy.................................. 32141/70
Sept. 23, 1971 Italy.................................. 29006/71

[52] U.S. Cl....................... 52/401, 52/397, 52/717, 52/718
[51] Int. Cl.............................................. E04f 19/02
[58] Field of Search ............. 52/397, 398, 400, 401, 52/511, 717, 718

[56] References Cited
UNITED STATES PATENTS

| | | |
|---|---|---|
| 2,140,887 | 12/1938 | Tinnerman........................... 52/718 |
| 2,208,008 | 7/1940 | McLaughlin....................... 52/718 X |
| 3,155,204 | 11/1964 | Campbell et al.................. 52/397 X |
| 3,611,663 | 10/1971 | Andrey................................ 52/397 |

Primary Examiner—Alfred C. Perham
Attorney, Agent, or Firm—Holman & Stern

[57] ABSTRACT

A shaped metal strap for positioning a glass windshield and/or a rear window in a seat specially provided therefor in the body of a motor vehicle, and adapted to have perimetral embellishing rim of the windshield or window applied thereto in which the shaped metal strap is provided, with a central portion intended to adhere to the outer surface of the glass and to the wall of the seat thereof, with two resilient tongues projecting sidewise and upward from the central portion and terminating with a portion having two perpendicular surfaces. One of these perpendicular surfaces adheres to the glass edge and the other to the inner surface of the glass. The central portion has also means for snappingly hooking the embellishing rim.

2 Claims, 10 Drawing Figures

WINDSHIELD AND OR REAR WINDOW POSITIONING MEMBER AND ATTENDANT PERIPHERAL GLASS RIM IN MOTOR CAR BODIES

This is a continuation of application Ser. No. 200,949 filed Nov. 22, 1971, now abandoned.

BACKGROUND OF THE INVENTION

This invention relates to a member for positioning the windshield and/or the rear window and, simultaneously, the attendant glass rim in the body of a motor car.

One of the most serious technical problems to solve in such a positioning operation is that of compensating for the clearances which are essentially due to constructional tolerances, which, sometimes, are in the order of magnitude of a millimeters, both in the windshield and the car body.

Another technical problem to be solved, which is connected with the positioning of the windshield and/or the rear window in the motor car bodies is that of applying thereto the peripheral glass rim so that the latter may always be in contact with the outer surface of the car body.

SUMMARY OF THE INVENTION

According to the present invention, these problems are solved by a member formed by a metal piece comprising a central base portion intended to adhere to the outer surface of the windshield and/or rear window and to the wall of its seat, two resiliently yielding tabs extending laterally upwards from said central portion and terminating in a portion having two perpendicular faces, with one adhering to the edge of the windshield and/or rear window, and the other to the inner surface thereof, said central portion being equipped with means for hooking up a peripheral profile arranged for covering the space between said edge of the windshield and/or rear window and its seat.

According to an embodiment of the present invention, said hooking means are formed by a tongue which is comparatively resiliently yielding and has substantially an S-like outline, which is extended substantially perpendicularly from said central portion and with which two hook-like projections cooperate, which are comparatively resiliently yieldable and extend from the central portion from both sides of said tongue and substantially perpendicularly thereto.

According to an embodiment of the invention, said hooking means are formed by a tongue which is comparatively resiliently yieldable and is substantially S-shaped and extends substantially perpendicularly from said central portion, two hook-shaped projections cooperating with said central portion, which are comparatively resiliently yieldable and are extended from the central portion from both sides, respectively, of said tongue and substantially perpendicular thereto.

According to an alternative embodiment of the invention, said means are formed by a first planar tongue which is extended substantially perpendicularly to the central portion of the member and has the upper edge curled outwardly, with said tongue cooperating with a second hook-shaped tongue which extends centrally thereof and is substantially coplanar with said outwardly curled member.

The foregoing and other features, objects and advantages of the invention will be better understood from a scrutiny of the ensuing description which illustrates, by way of example only and without limitation, two embodiments thereof, reference being had to the accompanying drawings, which are on an enlarged scale, and in which:

DETAILED DESCRIPTION OF THE EMBODIMENTS

Figure 1:
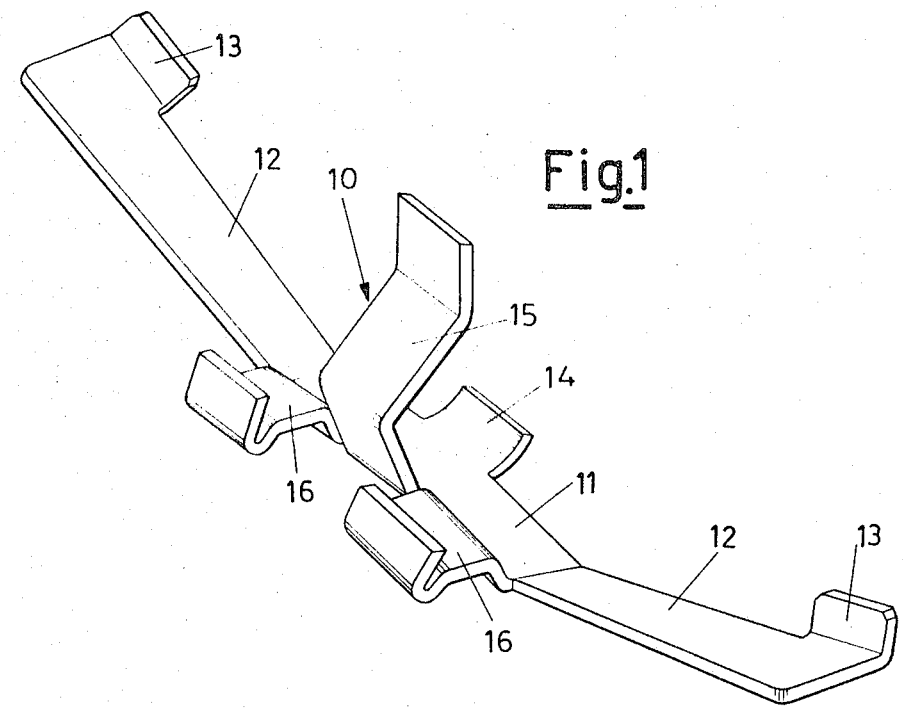
FIG. 1 is a perspective view which shows a first embodiment of a member according to the invention.
Figure 4:
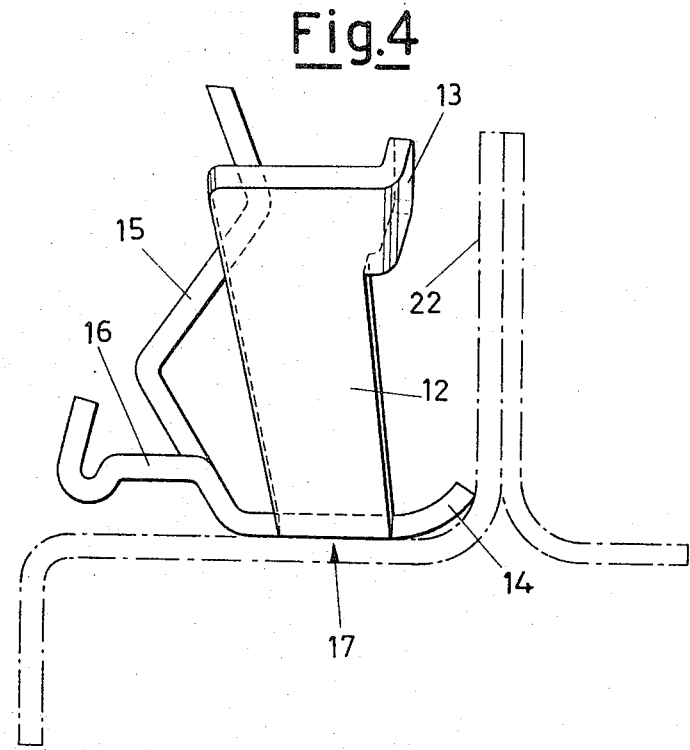
FIG. 4 is a side elevational view, partially in perspective, which illustrates the same member as positioned in the car body seat, the latter having been shown in phantom and, for the sake of a clearer showing, straight, rather than in the actual sloping position of FIG. 2.

Having now reference to FIGS. 1 to 4, the member embodied according to a first embodiment of the invention is generally shown at 10 and consists of a metal piece comprising a central portion 11 from whose opposite ends extend, with a slope from bottom to top, respective tabs 12 which are comparatively resiliently yieldable. The free ends of each of the tabs 12 has, laterally, a catching tooth or projection 13 lying on a plane which is substantially perpendicular to that on which the tabs 12 lie.

From one side of the intermediate zone of the projection 11 there extends a portion 14, which is slightly curled upwards, whereas from the other side, and symmetrically of said projection 14, there extends vertically, on a plane which is substantially perpendicular to that on which the portion 11 lies, a tongue 15 which is comparatively resiliently yieldable and is shaped substantially as an S, as has been clearly shown on the drawings.

From the portion 11, which is substantially coplanar thereto, there extend, in addition, laterally with respect to said tongue 15, two projections 16 which are hook-shaped and are also comparatively resiliently yieldable and cooperate, as will be explained hereinafter, with the tongue 15.

The above described member is employed in the following manner.

Figure 2:
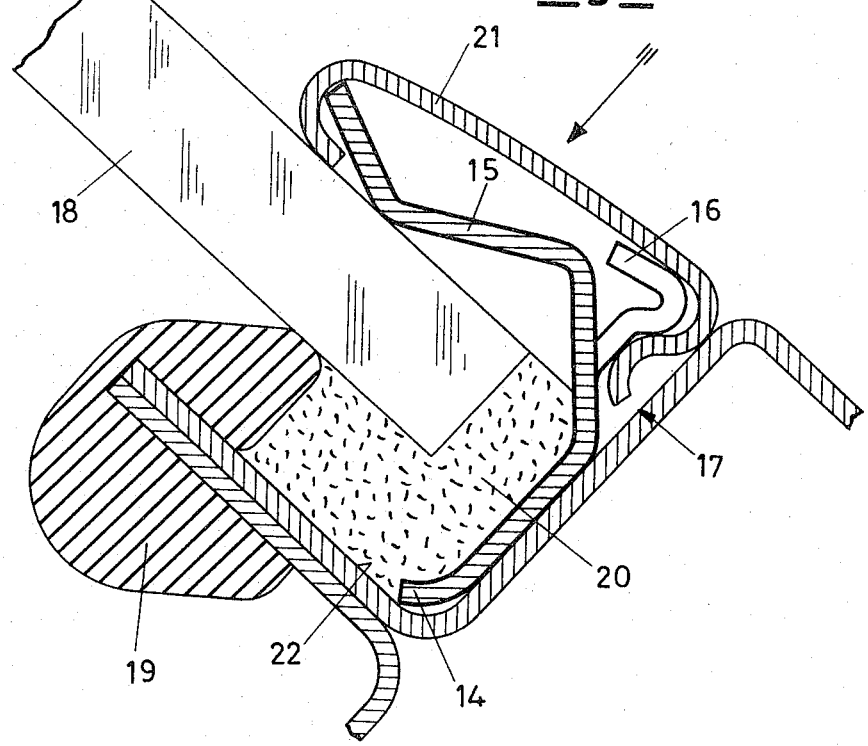
FIG. 2 is a detail shown in cross-section and which illustrates the windshield of a motor vehicle, with the relevant edge glass rim, which is mounted on the specially provided seat of the car body by the agency of a plurality of members such as the one shown in FIG. 1.
Figure 3:
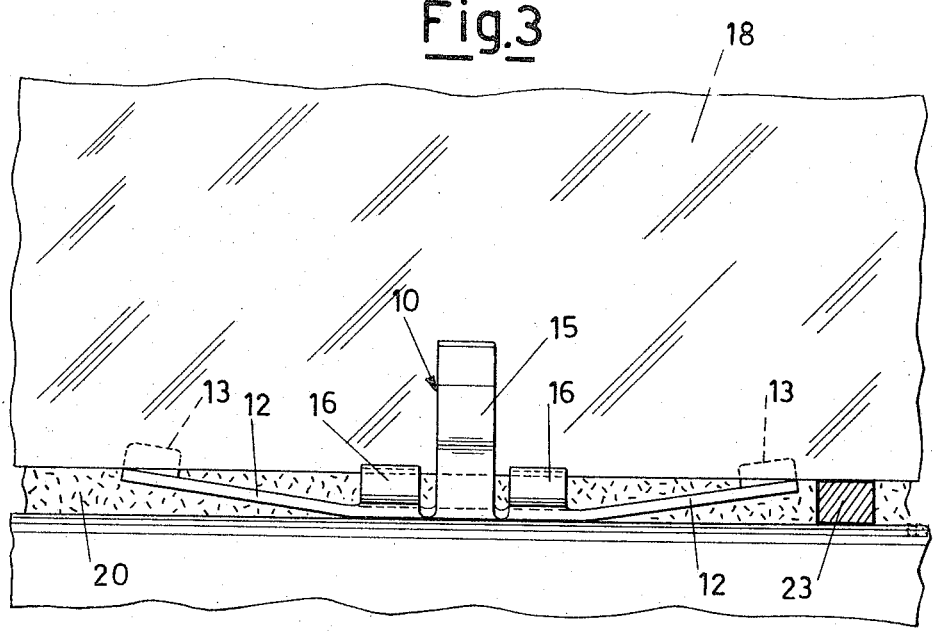
FIG. 3 is a detail viewed along the arrow of FIG. 2, the profile 21 having been removed.

Having particular reference to FIGS. 2 and 3, at 17 there is indicated the seat of the car body in which a windshield, or a rear window, as diagrammatically shown at 18, is mounted. In the seat there are first positioned two supporting pads 23 for the windshield or rear window 18, peripheral gasket 19, a cement layer 20, the windshield or rear window 18, and, lastly, along the entire peripheral outline of the window, there is forcibly inserted a plurality of the above described members 10, between the edges of the windshield or rear window 18 and the seat 17 of the body, with these members being partially embedded in the cement 20 so that the edges lie against the tabs 12. It will thus be understood that the weight of the windshield or rear window will quite particularly insist on the pads aforementioned and, to a minimum extent, on the tabs 12 of the lower members, with the tabs being flexurally stressed (FIGS. 2 and 3), whereas the tabs 12 of the upper and side members, for their being comparatively resiliently yieldable, will serve for centering the windshield or rear window 18 in the seat 17 of the car body, thus allowing for the clearances which are principally due to the constructional tolerances which have been mentioned hereinabove.

At 21 there is indicated a peripheral glass rim of the windshield or rear window 18, a rim which can be easily and rapidly snapped into position, as shown in FIG. 2, between the tongue 15 and the projections 16, by virtue of the resiliency both of the former and the latter.

By so doing, the rim 21 is not directly applied to the windshield or rear window, as in the conventional mounting systems, so that it is not influenced by possible setting displacements of the windshield but it remains, with the lapse of time, still in contact with the surface of the seat 17 of the car body.

It should be observed that the tongue 15, along, if constructed with a more projecting outer edge, could serve for applying, in a snapping mode, the glass rim 21, with the hook shaped projections 16 being adopted to ensure a tighter fit.

The function of the end teeth 13 of the tabs 12 is to retain the windshield 18, whereas that of the projection 14 is to position the member 10 relative to ledge 22 of the seat 17 (FIGS. 2 and 4), thus preventing also the rotation towards the ledge; the projection 14, moreover, provides anchorage of the member into the cement.

Figure 5:
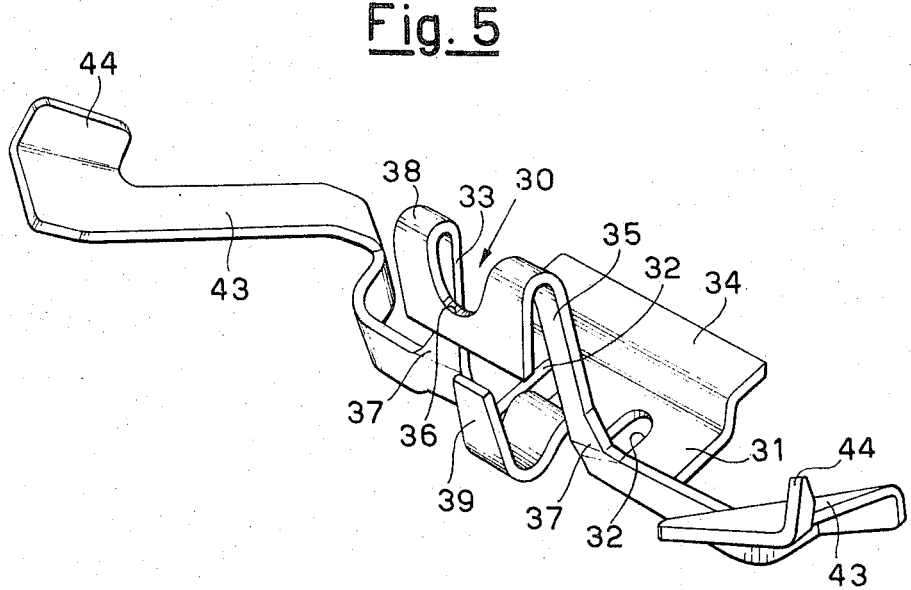
FIG. 5 is a perspective view showing a second embodiment of a member according to the invention.
Figure 6:
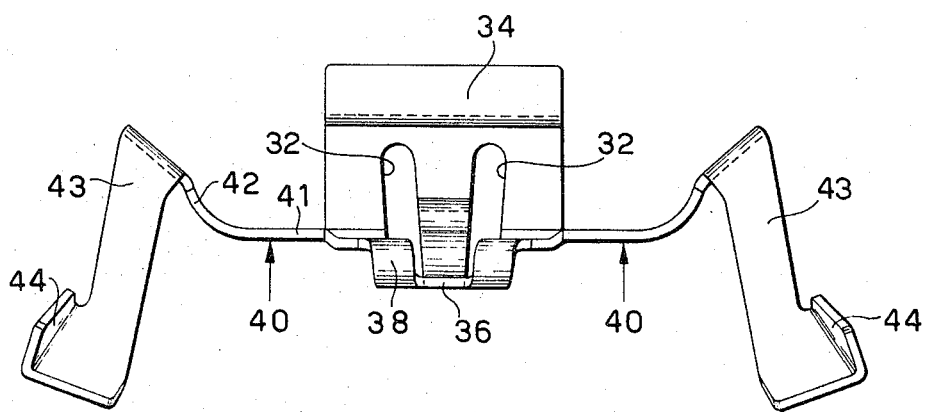
FIG. 6 is a plan view showing the same member as that of FIG. 5.
Figure 8:
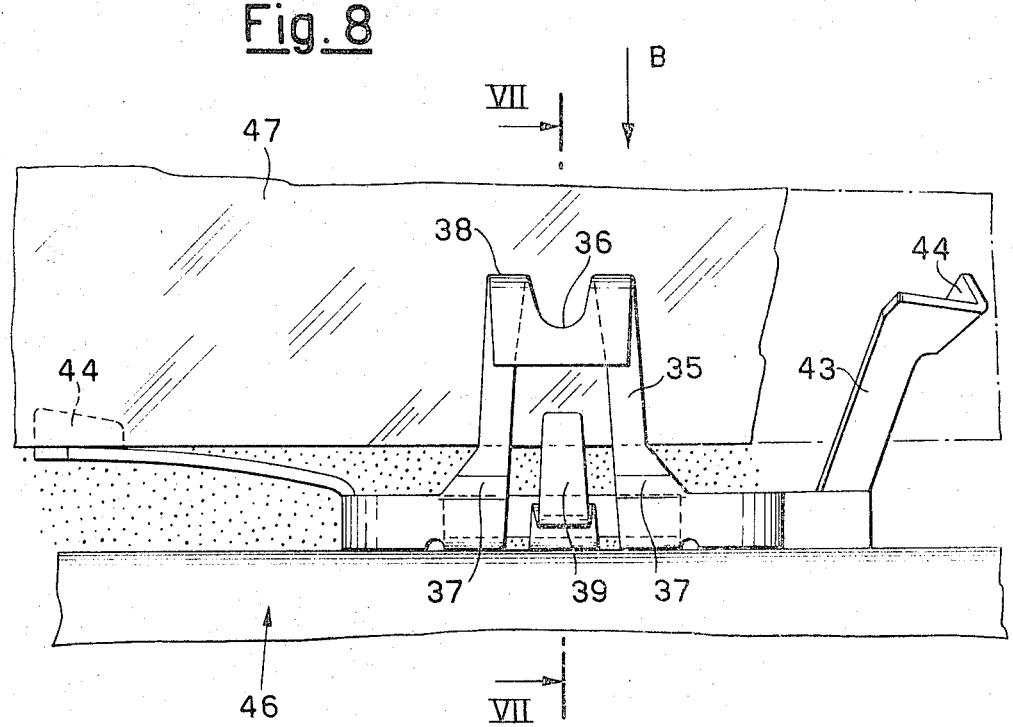
FIG. 8 is a detail, as viewed along the arrow A of FIG. 7, the profile having been removed.
Figure 7:
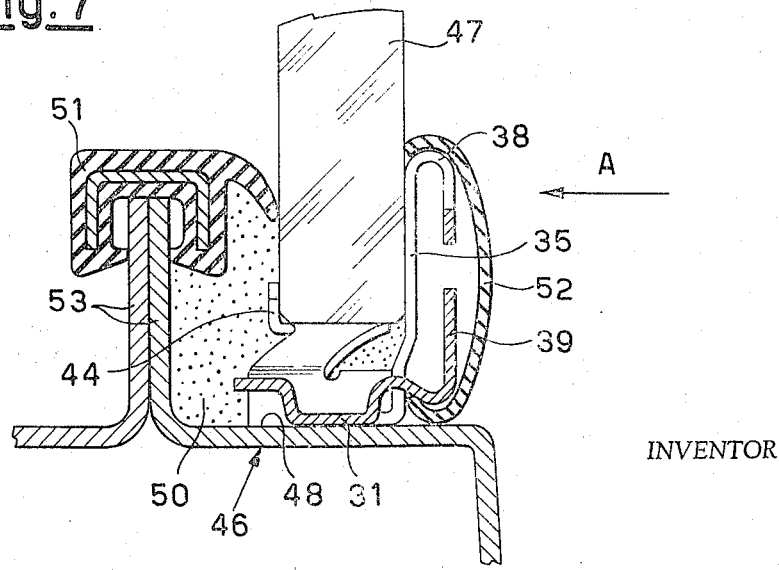
FIG. 7 is a detail shown in a cross-sectional view taken along the line VII—VII of FIG. 8.

FIGS. 5 and 6 of the drawings illustrate a second embodiment of a positioning member according to the invention, in which the member is shown as it comes out of the mold. Said positioning member is generally indicated with the reference numeral 30 and comprises a planar central portion 31 having an edge 34 curled upwards and then horizontally and a first tongue 35 which extends vertically from the edge which is opposite to the edge 34. The upper edge of the tongue 35 is curled outwards as at 38 so as to provide a rounded matching surface for a 52 as shown in FIG. 7. In addition, the tongue 35 has, in its bottom portion, a tiny elbow 37.

Through the portion 31 and the tongue 35 there are formed continuous lightening slots 32, 33 and 36 and a second tongue 39, which is hook-shaped, cooperates with 35 for applying the rim 52.

From the opposite sides of the lower portion of the tongue 35 there extend, respectively, two arms 40 which have substantially an L-shape and a first portion 41 which is substantially coplanar with the tongue 35 and a second portion 42 which is substantially perpendicular to the tongue 35.

The arms 40 are extended, each, by a wing 43, which is resiliently yieldable, and is extended upwards and forward beyond the tongue 35.

Each of the wings 43 has, at the free end, a catching tooth or projection 44 which is perpendicular thereto.

In FIG. 7, at 46, there is indicated the seat in a car body, in which a windshield and/or rear window 47 is to be mounted. Similarly to what has been described hereinbefore, prior to placing the windshield and/or the rear window in the seat, there is mounted, astride sheet metal 53, a gasket 51 and there are positioned the glass-supporting pads (shown at 23 in FIG. 3, but not shown herein) on bottom wall 48 of the seat 46. Cement 50 is then injected in the space between the windshield and/or rear window and the seat 46 of the car body: lastly, there are mounted a plurality of members 30 between the peripheral edge of the widnshield and/or rear window and the seat 46 with, the members 30 being partially embedded in the cement mass 50.

Figure 9:
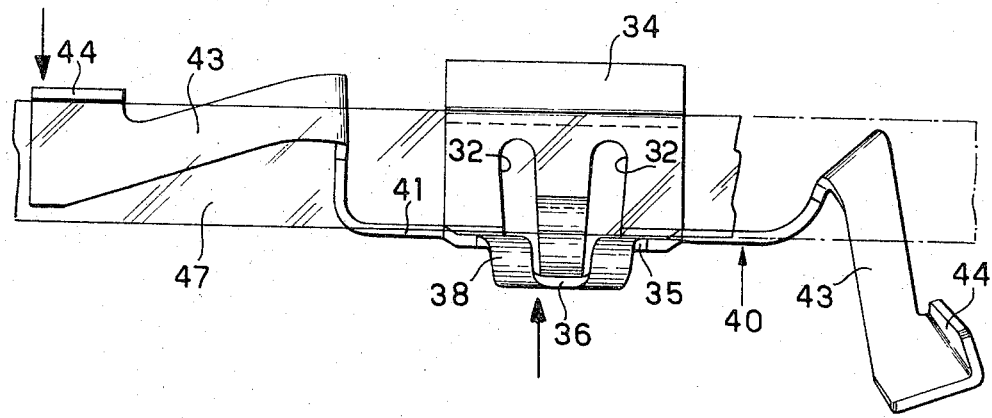
FIG. 9 is a detail viewed along the arrow B of FIG. 8.
Figure 10:
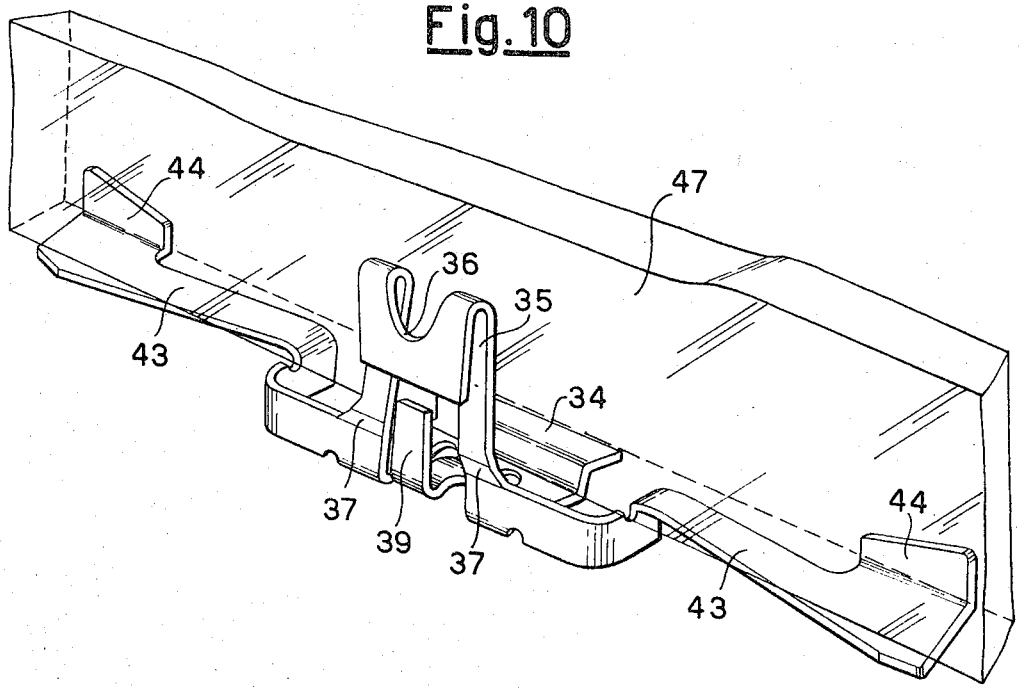
FIG. 10 is a detail shown in perspective view of said member as mounted on a windshield and/or rear window.

As can be clearly seen by comparing FIGS. 5 and 6 with FIGS. 9 and 10, the member 30 undergoes a deformation during progress of assembly. As a matter of fact, for the assemblage, the central portion 31 is inserted between the wall 48 and the edge of the windshield and/or rear window, and the tongue 35 is brought against the outer surface of the latter by forcing the wings 43 from the position shown at the right of FIG. 9 to the position shown at the left of the same figure so as to bring the teeth 44 to engage the inner surface of the windshield and/or rear window. This movement of the wings 43 is made possible by the presence of the L-shaped projections 40. By so doing, as will be understood, the windshield and/or rear window, in addition to being supported by the pads mentioned above is also supported by the resiliently yieldable wings 43, and is held in position in its seat by the action and reaction, respectively, in the direction of the arrows, of the tongue 35 and the teeth 44 (FIG. 9). The last step is to mount the glass rim 52. The latter is snappingly held by the rounded surface 38 of the first tongue 35 and by the second tongue 39, which is hook shaped, of the members 30 in the manner which has been clearly shown in FIG. 7.

What is claimed is:

1. A member for positioning a window in a seat of a motor vehicle body and also adapted to have a perimetral embellishing rim of the window applied thereto and in which the embellishing rim is provided with two curved edges, comprising a metal piece having a central portion, a first tongue integral with the central portion and extending in a plane essentially perpendicular to that of the central portion, at least a second hook-shaped tongue integral with the central portion, said first tongue having a free end bent to provide a rounded corner for receiving by a snap fitting, one curved edge of the embellishing ring, the second curved edge of the embellishing ring being fitted on said second tongue, two L-shaped side arms integral with and extending outwardly from said first tongue, each side arm having a first portion substantially co-planar with the first tongue and a second portion substantially perpendicular to said first tongue, and a resiliently yieldable wing at the free end of each second portion lying in a plane essentially perpendicular to that of said first tongue, said wings being obliquely inclined with respect to the plane of the central portion and to the plane of said first tongue so that the wings before assembling of the window are spaced from said first tongue by a distance lesser than the thickness of the window, with the window upon assemblage being forcingly inserted between said first tongue and the wings and with the perimetral contour of the window abutted against said wings.

2. The positioning member as claimed in claim 1, in which each wing is provided with a projection extending perpendicularly thereto, with said perpendicular projections engaging the inner surface of the window.

* * * * *